US011179729B2

(12) United States Patent
Previero

(10) Patent No.: US 11,179,729 B2
(45) Date of Patent: Nov. 23, 2021

(54) METHOD AND APPARATUS FOR WASHING AND SEPARATING PLASTICS MATERIAL

(71) Applicant: PREVIERO N. S.R.L., Lissone (IT)

(72) Inventor: Flavio Previero, Lissone (IT)

(73) Assignee: Previero N. S.r.l.

( * ) Notice: Subject to any disclaimer, the term of this patent is extended or adjusted under 35 U.S.C. 154(b) by 248 days.

(21) Appl. No.: 16/444,433

(22) PCT Filed: Dec. 20, 2017

(86) PCT No.: PCT/EP2017/083781
§ 371 (c)(1),
(2) Date: Jun. 18, 2019

(87) PCT Pub. No.: WO2018/115104
PCT Pub. Date: Jun. 28, 2018

(65) Prior Publication Data
US 2019/0351427 A1    Nov. 21, 2019

(30) Foreign Application Priority Data

Dec. 20, 2016    (IT) .......................... 102016000129016

(51) Int. Cl.
*B03B 5/02*          (2006.01)
*B29B 17/02*        (2006.01)
(Continued)

(52) U.S. Cl.
CPC .............. *B03B 5/02* (2013.01); *B29B 17/02* (2013.01); *B03B 5/38* (2013.01); *B08B 3/104* (2013.01);
(Continued)

(58) Field of Classification Search
CPC .. B03B 5/02; B03B 5/28; B03B 5/623; B08B 3/104
See application file for complete search history.

(56) References Cited

U.S. PATENT DOCUMENTS 2,679,982 A    6/1954  Thyle
3,054,230 A    9/1962  Logue
(Continued)

FOREIGN PATENT DOCUMENTS

DE    2804729 A1    8/1979
DE    4337206 C1    3/1995
(Continued)

*Primary Examiner* — Charles A Fox
*Assistant Examiner* — Jessica L Burkman
(74) *Attorney, Agent, or Firm* — Laubscher & Laubscher, P.C.

(57) ABSTRACT

A method and apparatus for washing and separating pieces of plastics material from contaminating material that also includes metal elements includes a stirring device having a plurality of blades which are driven in a washing fluid to generate a turbulent stirring action to mechanically remove part of the contaminating material from the plastics material. The tilt of the blades and the rotation speed of the stirring device are chosen carefully to generate an upward thrusting action to maintain the plastics material with a specific weight that is greater than the specific weight of the fluid in a floating condition. The plastics material is retained inside the container for sufficient time to obtain a desired degree of purity and decontamination for the plastics material, after which it is evacuated by controlled overflow.

15 Claims, 5 Drawing Sheets

(51) Int. Cl.
*B03B 5/38* (2006.01)
*B08B 3/10* (2006.01)

(52) U.S. Cl.
CPC ................ *B29B 2017/0244* (2013.01); *B29B 2017/0289* (2013.01)

(56) References Cited

U.S. PATENT DOCUMENTS

| | | |
|---|---|---|
| 5,443,652 A | 8/1995 | Scarola et al. |
| 5,948,276 A | 9/1999 | Neureither et al. |
| 6,797,073 B1 * | 9/2004 | Teruggi ............... B08B 3/14 134/18 |
| 2013/0146105 A1 * | 6/2013 | Kirchhoff ............ B08B 3/104 134/32 |
| 2016/0122443 A1 * | 5/2016 | Hardy ................. B03B 5/44 536/20 |

FOREIGN PATENT DOCUMENTS

| | | |
|---|---|---|
| EP | 0359106 A2 | 3/1990 |
| EP | 2703086 A1 | 3/2014 |

* cited by examiner

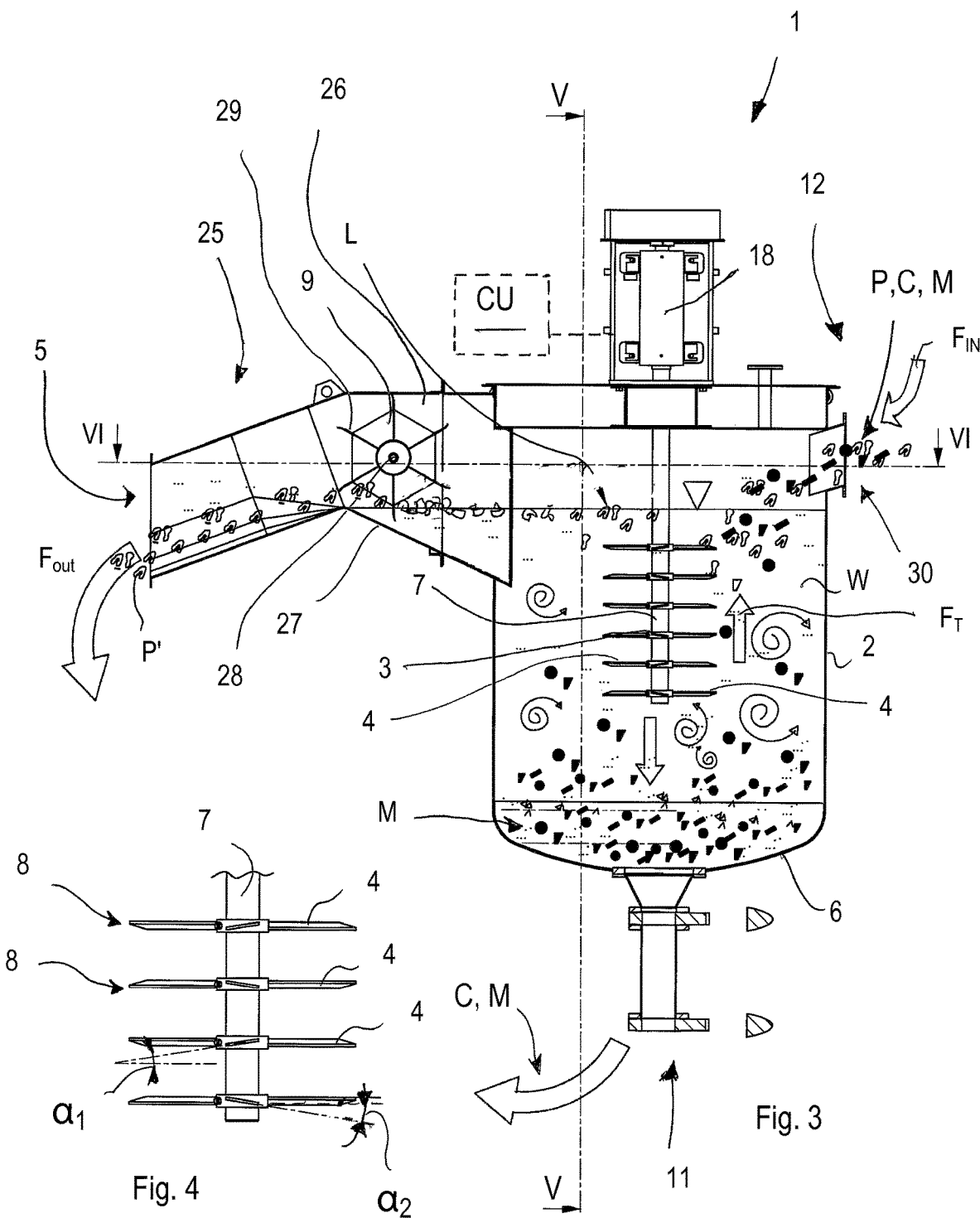

METHOD AND APPARATUS FOR WASHING AND SEPARATING PLASTICS MATERIAL

CROSS-REFERENCE TO RELATED APPLICATIONS

This application is a § 371 National Stage Entry of International Patent Application No. PCT/EP2017/083781 filed Dec. 20, 2017, Application No. PCT/EP2017/083781 claims priority of IT102016000129016 filed Dec. 20, 2016. The entire content of these applications are incorporated herein by reference.

BACKGROUND OF THE INVENTION

The present invention relates to a method and an apparatus for washing and separating plastics material—coming from domestic and/or industrial waste milled or reduced into pieces—from contaminants of various types, especially from contaminating elements of metal type.

As known, the plastics material that comes from solid urban and industrial waste is subjected to various treatments that include pre-washing, washing, milling into pieces of small dimensions and one or more subsequent more accurate washing steps. Post-consumption plastics material includes bottles, containers, other objects, and comprises not only PET (polyethylene terephthalate) but also P. E (polyethylene), P. V. C (polyvinyl chloride), P. P. (polypropylene), P. S. (polystyrene) and other plastics materials.

In order for such plastics materials to be able to be reused successfully as regenerated material, it is necessary for them to undergo careful decontamination with elimination of all the undesirable substances coupled therewith originally or which inevitably get attached thereto during the process of collection from urban or industrial sites as far as the plastics recycling plants.

Apparatuses for washing plastics materials are known from EP2703086, DE4337206, U.S. Pat. No. 5,443,652, DE2804729 and EP0359106.

If the material to be treated consists, for example, of bottles and/or containers made of plastics material, there is a first pre-washing step in equipment provided with rotating cylinders in which the bottles and/or containers are subjected to a pre-washing action to eliminate the coarser contamination, such as labels, and part of the dirt that has adhered on the bottles during collection and storage, etc. The containers/bottles are then sent to a milling mill to be reduced to small sized pieces. The milled plastics material is then transferred to other washing apparatuses, such as centrifugal separating units in which the pieces material remains for the time required to complete the washing and rinsing operations and avoid contaminating residues persisting that would otherwise compromise the subsequent use of the recovered material.

One particularly felt, serious and difficult problem to be addressed is the undesired presence of metal elements or fragments that are unfortunately found in the plastics material to be treated and which come, for example, from daily consumer goods such as small plastics material bottles such as spray bottles, dispensing/dosing caps, atomising devices: inside such objects there are in fact metal springs, balls of metal and/or other metal pieces that inevitably advance, in the recycling process, together with the plastics material component.

It should be added that the metal elements are found not only on the daily consumer goods that have just been mentioned but also in a whole series of types of waste that originate from sectors such as, for example, the car industry. All the types of refuse classified as WEEE (waste electrical and electronic equipment) must also be considered and which comprise a vast range of plastics materials from which it is necessary to separate copper, iron, steel, aluminium, glass, silver, lead, etc.

In substance, the plastics material from which it is necessary to separate the metals comprises not only the PET, PS, PE, PVC, PP, PS cited above, but also ABS (acrylonitrile butadiene styrene), PC (polycarbonate), PMMA (poly(methyl methacrylate), PA (polyamide), SAN (styrene acrylonitrile resin), and many other plastics materials.

In some types of known plant, such as for example the plant disclosed in U.S. Pat. No. 5,948,276, hydrocyclone units are provided downstream of which centrifugal separating units can be provided. In hydrocyclone units, the "cyclone" effect generated by the vortex causes small pieces of plastics material to separate from the heavy contaminant, which drops by gravity to the bottom of the tank, from which it is periodically removed.

The vortex flow of the washing fluid forces the pieces of plastics material to reascend to the upper edge of the tank and exit with the washing fluid through simple overflowing to then be sent to the centrifugal unit further downstream.

The vortex motion of the fluid in the hydrocyclone unit, if on the one side it tends to separate the fraction of lighter plastics materials from the heavier materials by exploiting the different degrees of floating, it is nevertheless not satisfactorily effective in the action of washing the plastics material and does not achieve complete detachment of the contaminating parts adhering to the plastic. In other words, the bland washing action caused by a simple vortex motion does not enable the contaminant to be separated from the pieces of plastics material.

In other words, there is no mechanical action to detach the contaminants sticking to the pieces of plastics material. Thus once again, it is necessary to resort to a further washing unit, in this case, the centrifugal unit, arranged in series and further downstream to treat all the product that has been processed by the stirrer and by the hydrocyclone unit. This plant configuration, in addition to being structurally and functionally more complex to make and managed, does not even enable the plastics material to be processed satisfactorily and is often not able to separate effectively from the plastics the metal fraction, an even minimal presence of which is extremely deleterious inasmuch as it drastically reduces the quality of the material to be recovered.

There thus still remains a great need to have available a system that is able to overcome the drawbacks and limits of known washing and separating apparatuses.

SUMMARY OF THE INVENTION

One object of the present invention is to improve current washing and separating systems for plastics materials.

Another object is to provide a method and an apparatus that enable high levels of efficacy to be achieved in the process of washing plastics materials and separating from the contaminants, with particular reference to contaminants of metal type.

Another object is to provide a method and an apparatus that are very simple respectively from the functional and structural point of view but at the same time equally efficient and able to provide qualitatively high levels of the recovered product that are greater than with traditional systems, ensuring at the same time limited consumption of washing fluid and reduced energy output.

BRIEF DESCRIPTION OF THE DRAWINGS

These and further features and advantages of the washing and separating method and apparatus will be clearer from the following description, with reference to the drawings, in which:

FIG. 3 is a longitudinal section along the line in FIG. 2;

FIG. 4 is an enlarged detail in FIG. 3;

DETAILED DESCRIPTION OF THE INVENTION

Figure 1:
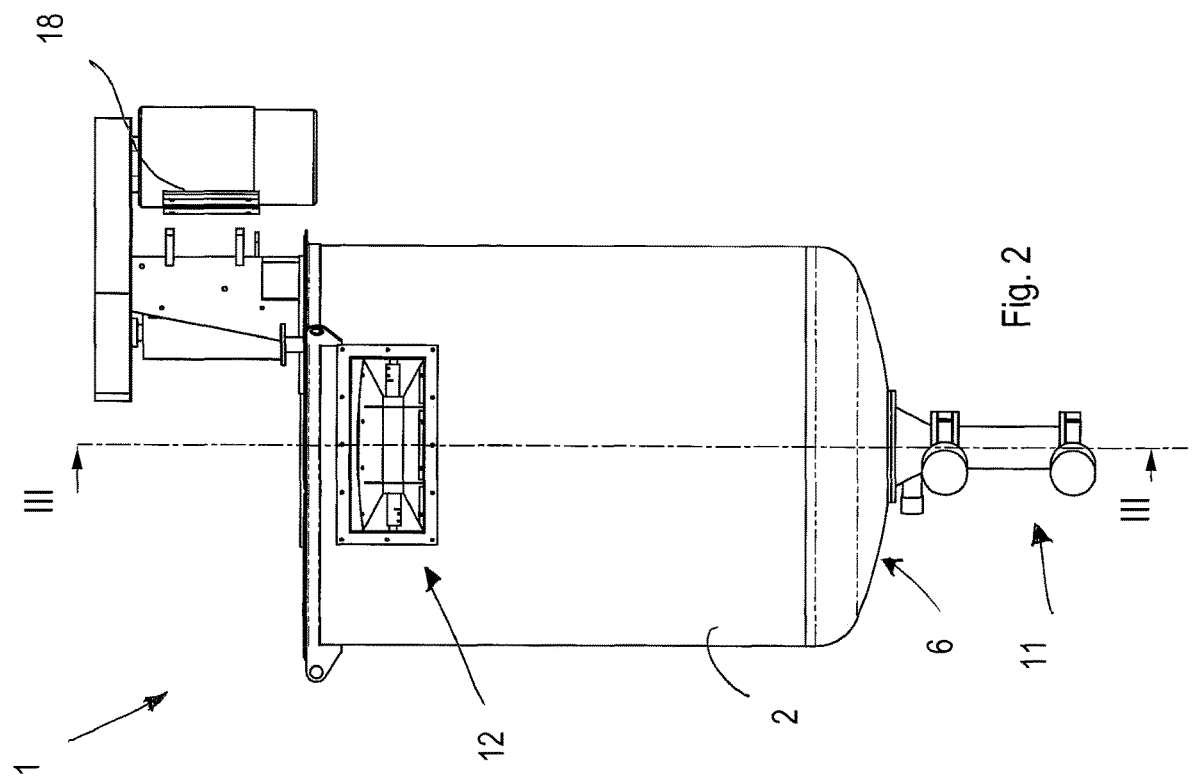
FIGS. 1 and 2 are two different views of a washing and separating apparatus according to the present invention.
Figure 2:
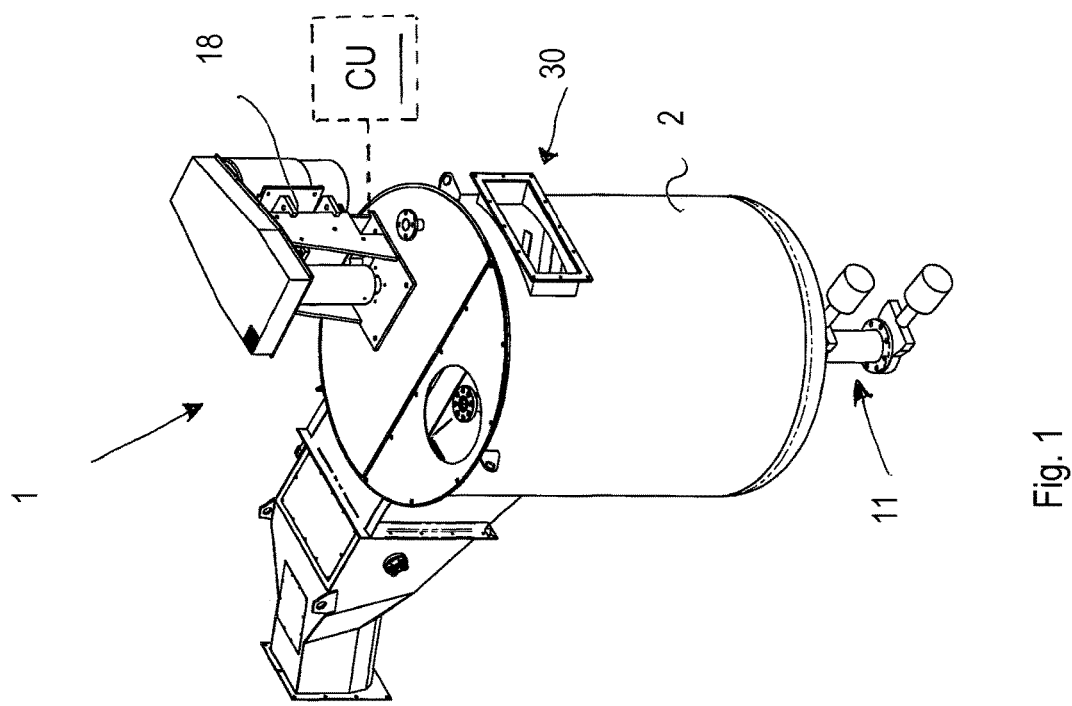
Figure 5:
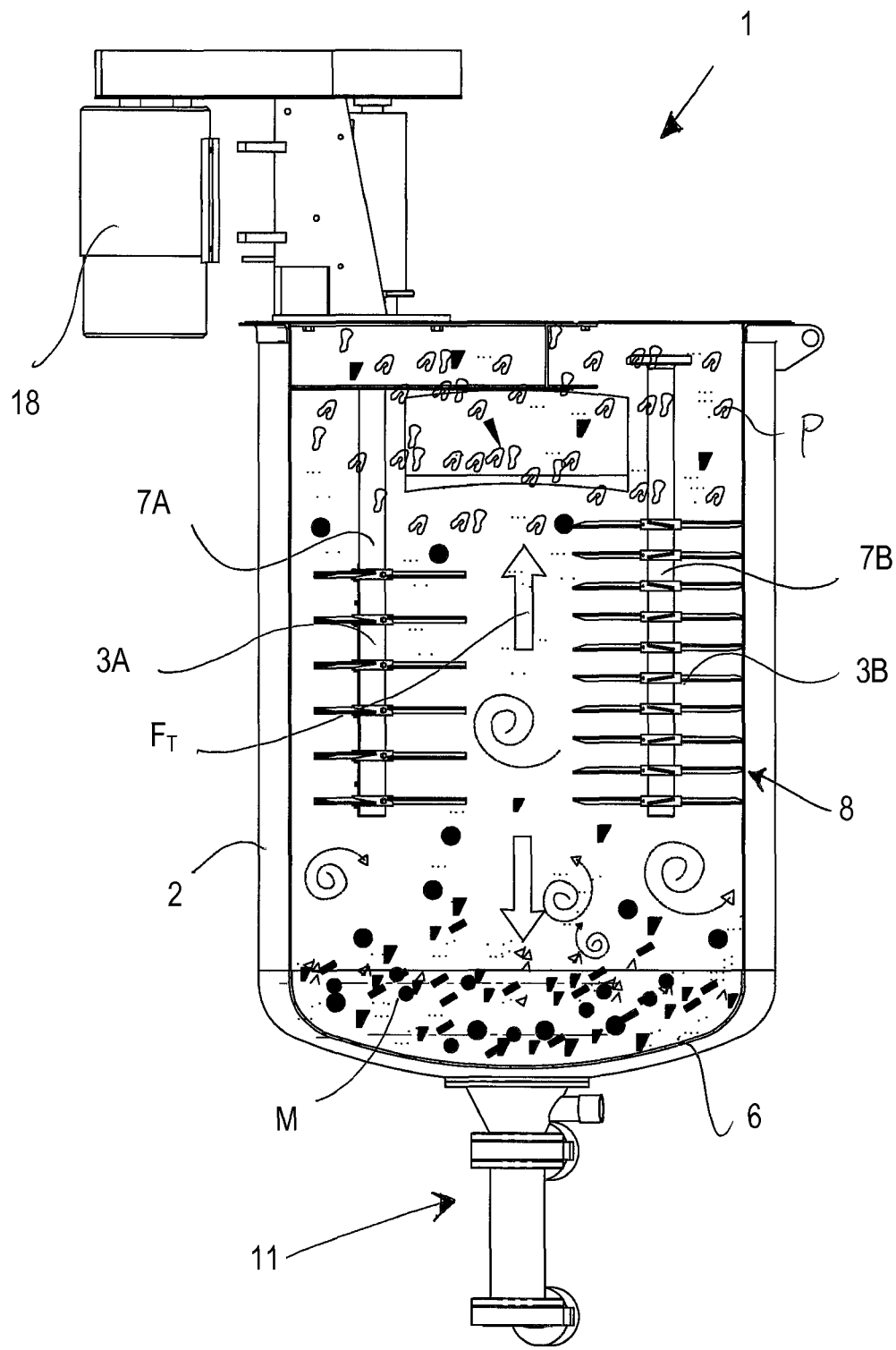
FIG. 5 is a longitudinal section along the line V-V in FIG. 3.

With reference to the attached Figures, a washing and separating apparatus 1 for plastics materials P coming from prewashing and milling of various post-consumption objects is disclosed. The plastics material P, before being introduced into the apparatus 1, is reduced into small sized pieces with dimensions from a few mm to a few cm; the method and the apparatus 1 disclosed below have the purpose of washing and separating from the metal and non-metal contaminants the aforesaid plastics material reduced into small pieces.

The apparatus 1 comprises a washing container 2 arranged for receiving, from an inlet port 30, by suitable supplying element 12, an entering flow $F_{in}$ of a washing fluid W, in particular water with possible washing additives, and the pieces of plastics material P to which the contaminating material C to be eliminated adheres.

An outlet port 5 is provided through which an outward flow $F_{out}$ of Washing fluid W exits by overflow with processed, i.e. washed, plastics material P', from which the contaminants C have been detached through mechanical action.

The outlet port 5 is bounded by a discharge channel 25 that protrudes transversely outwards from a lateral wall of the washing container 2. The discharge channel 25 is diametrically opposite the inlet port 30 for supplying the plastics material P and the washing fluid W.

Therefore, the apparatus 1 comprises a single washing container 2, provided with an inlet port 30 and an outlet port 5 that are arranged diametrically opposite to one other. The apparatus 1, including such a single washing container 2, is therefore configured for containing in a single washing chamber (delimited by the washing container 2) the washing fluid W and plastics material P to be treated.

The discharge channel 25 is bounded laterally by two side walls 26 and below by a ramp wall 27 that protrudes from a first height from the side wall of the container 2, extending in a tilted manner upwards as far as a second higher height.

The outer Wall that bounds laterally the washing container 2 is cylindrical in shape. However such an outer wall may have another suitable shape. The outer diameter of the washing container 2 can vary, by way of non-limiting example, from 1200 mm to 2200 mm according to need.

The container 2 is bounded below by a bottom 6 wall. The bottom 6 wall is inwardly, i.e. upwardly, concave, and this enables the heavier contaminating bodies C, in particular metal elements M, to accumulate, once they have precipitated because of the specific Weight thereof, in a localized manner to the central zone of the bottom 6, to be able to be moved easily periodically. For this purpose, an evacuating device 11 is provided for the contaminating products that are deposited on the bottom 6, in particular the metal elements M of valve or pump type.

In particular, a dual valve system 11 can be provided, i.e. a pair of valves (for example of the solenoid valve type) arranged in a conduit, one below the other and each driven by its own actuator.

The selective opening and closing of the two valves enables the heavy sediments to be discharged periodically that have accumulated on the bottom 6, minimizing the exit of the washing fluid W.

Inside the washing container 2, a stirring arrangement 3 is provided that is fitted with blades 4 arranged for generating in the washing fluid W a turbulent stirring action to remove from the plastics material P, through mechanical action, the contaminating material C adhering thereto.

Figure 6:
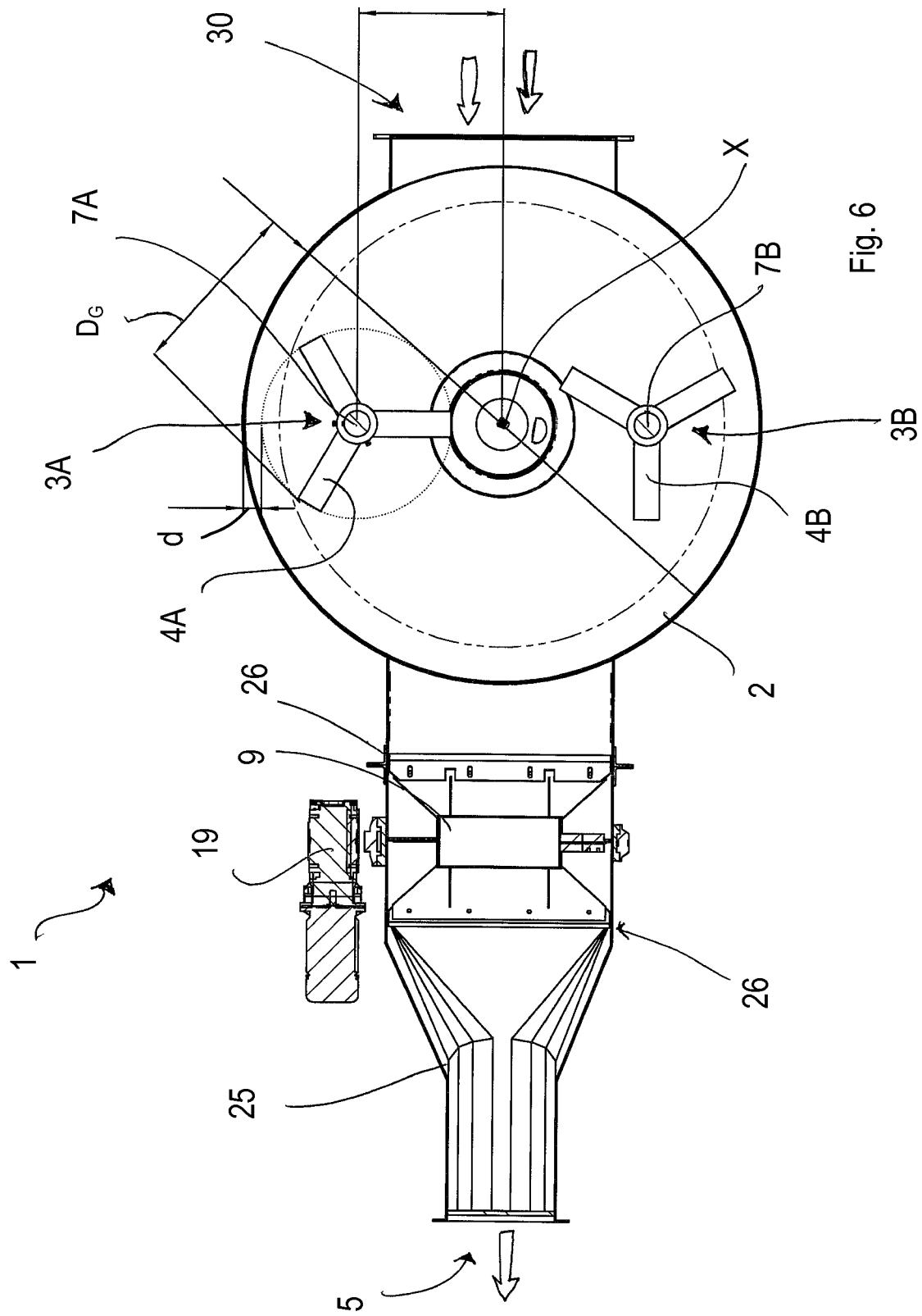
FIG. 6 is a top view of the apparatus.

In a first embodiment, the stirring arrangement comprises a single stirrer 3. In another embodiment, shown in the attached Figures, the stirring arrangement comprises two distinct stirrers 3A, and 3B, arranged on opposite sides to a longitudinal axis X of the washing container 2. In particular, as visible in FIG. 6, the axes of the rotor shafts 7A, and 7B, lie on a vertical plane that is placed orthogonally to a median plane that traverses longitudinally the discharge channel 25, passing through the inlet 30 opening.

The impeller units 8 have diameters $D_G$ comprised between 450 and 650 mm. The rotor shafts 7A and/or 7B have rotation axes positioned in such a manner that during the circular trajectory the blades 4 remain at a minimum distance from the lateral wall of the washing container 2. This distance is correlated with the diameter $D_G$ of the impeller units 8 and can vary from 0.1 to 0.4 times this diameter $D_G$. By way of example, the minimum distance "d" between the circular trajectory plotted by the blades and the lateral inner surface of the container 2 can vary from about 45 mm to about 260 mm, depending on the value of the aforesaid diameter $D_G$.

The axes of the rotor shafts 7A, and 7B are from about 350 to about 550 mm from the central longitudinal axis X, according to the diameter of the washing container 2 and of the impeller units 8.

Each stirrer 3 comprises a rotor shaft 7 arranged vertically and driven by a variable speed motor 18, such as an electric motor of inverter type.

From numerous and intense experimental tests, it was found that at a rotation speed $Y_R$ of the stirring arrangement 3 comprised between 200 and 400 rpm, optimum efficacy levels are obtained in the washing and separating process. The rotations of the two stirrers 3A, 3B can also have two different speeds and opposite directions. By intervening suitably on the rotation speed values $V_R$, the thrust force can be set that is suitable for floating plastics materials with a specific weight that is greater than or the same as 1 kg/dm³ up to 2 kg/dm³.

A control unit CU is provided that on the basis of specific process needs, the properties of the materials P to be processed, of the contaminants C and of the washing fluid W, adjusts in an optimum manner the rotation speed $V_R$ including the one or more stirrers 3.

On each stirrer rotor shaft 7 a series of impeller units 8 is mounted, which are placed on top of one another, and in a number varying from 4 to 12, according to the geometric dimensions of the apparatus 1 and/or of specific process needs. Each impeller unit 8 comprises at least two blades 4, in particular, in the embodiments shown in the Figures, for each impeller unit 8 three blades 4 are provided that are angularly equidistant and protrude transversely from the respective rotor shaft 7. The number of the blades 4 can anyway be varied according to the needs of the process, provided that they are suitable for achieving the effects disclosed in the following.

In each single impeller unit 8, the blades 4 are oriented in an identical manner to one another. Nevertheless, the orientation of the blades of an impeller unit 8 is opposite the orientation of the adjacent impeller unit 8 placed immediately above or below. In other words, the tilts, or orientations, of the blades 4 vary reciprocally from one impeller unit 8 to the next. Then considering the rotation direction of the stirrer 3, there is thus a series of blades 4 tilted upwards, and a series of blades tilted downwards.

The groups of blades 4 are oriented with angles of tilt that are such as to obtain the desired effect of generating in the fluid W a stirring and turbulence action that shakes the pieces of plastics material P, thus effectively promoting the detaching from the latter of the contaminating bodies C, and at the same time have the effect of imposing on the plastics material P an upward hydrodynamic thrust.

More precisely, with reference to FIGS. 3 and 4, the blades 4 of a first group of impeller units 8 are tilted by a first angle of tilt al comprised between 5° and 30° with respect to a horizontal plane, and the blades 4 of a second group of impeller units 8 are tilted by a second angle of tilt α2 comprised between −5° and −30° with respect to the horizontal plane.

The apparatus 1 thus configured enables not only plastics materials with very low specific weight but also plastics materials that have specific weight γ2 that is greater than the specific weight γ1 of the washing fluid W to be maintained in a floating condition.

With angles of tilt α1, α2 values chosen from the aforesaid intervals, in combination with the rotation speed $V_R$ of the stirring arrangement 3 comprised between 200 and 400 rpm, and the dimensional features and structural configuration that are disclosed above, excellent performance is obtained in terms of efficacy in the mechanical action of washing and in the floating action.

The apparatus 1 comprises a rotatable control element 9 configured for retaining, for a given time, the plastics material P in the washing container 2, preventing the plastics material P, once it has been supplied to the washing container 2, from exiting immediately without first undergoing the washing process through mechanical stirring. The rotatable element 9 rotates at a speed that is suitably adjusted by the control unit CU to advance in a controlled manner the quantity of processed plastics material P' to the discharge channel 25 and then to the outlet port 5.

The rotatable control element 9 is of roller or drum type with a horizontal axis, or belt type, and is driven by a further variable speed motor device 19, such as an electric motor of inverter type. The rotatable element 9, for example the roller element 9, extends between the two side walls 26 of the discharge channel 25 and above the ramp wall 27 of this channel. The rotatable control element 9 comprises a rotating shaft 28 from which there protrude radially, and according to axial planes, baffles 29 that are suitable for interacting with the plastics material P. The rotatable element 9 is positioned in height with respect to the ramp wall 27 in such a manner that the baffles 29 touch or partially penetrate the washing fluid W below the free surface L, to intercept the pieces of plastics material P.

The control unit CU is configured for rotating the roller element 9 at a speed that is such as to impose on the plastics material P to remain in the washing container 2 for a given average dwell time that is sufficient to obtain the desired degree of purity and decontamination for the plastics material P.

As indicated above, the control unit CU is programmed for adjusting the rotation speed $V_R$ of the stirring devices 3A, 3B to generate a thrusting action $F_T$ upwards so as to maintain in a floating condition the plastics material P with a specific weight that is greater than that of the washing fluid W. In particular, if the fluid W substantially comprises water, with a specific weight γ1 of 1 kg/dm³, the appropriate rotation speed of the stirring arrangement 3, combined with a Specific orientation of the blades 4 as disclosed above, have the effect of pushing upwards in a floating condition also the plastics materials such as PET (specific weight γ2 equal to 1.4 kg/dm³), PVC (γ2 equal to 1.3 kg/dm³), nylon (γ2 equal to 1.13 kg/dm³), polystyrene (γ2 equal to 1.04 kg/dm³) etc. At the same time, the rotation speed $V_R$ of the stirring arrangement 3 must be such that the aforesaid thrusting action $F_T$ is limited to a value that is such as not to hinder the downward precipitation of the heavy contaminants, and in particular of the harmful metal elements M, which have greater specific weight γ3 values, which range from values hardly greater than 2 kg/dm³ (e.g. aluminium), to higher values.

In other words, the upward floating thrust imposed by the blades 4 of the stirrers 3, has to be sufficiently high so that, together with the hydrostatic thrust which is on its own insufficient to overcome the weight force acting on the heavy plastics pieces it helps the latter to reascend, remaining in a floating condition near the free surface L. At the same time, however, the upward thrusting action must not exceed a certain value so as not to prevent undesired heavier bodies such as metals from precipitating to the bottom 6.

Figure 7:
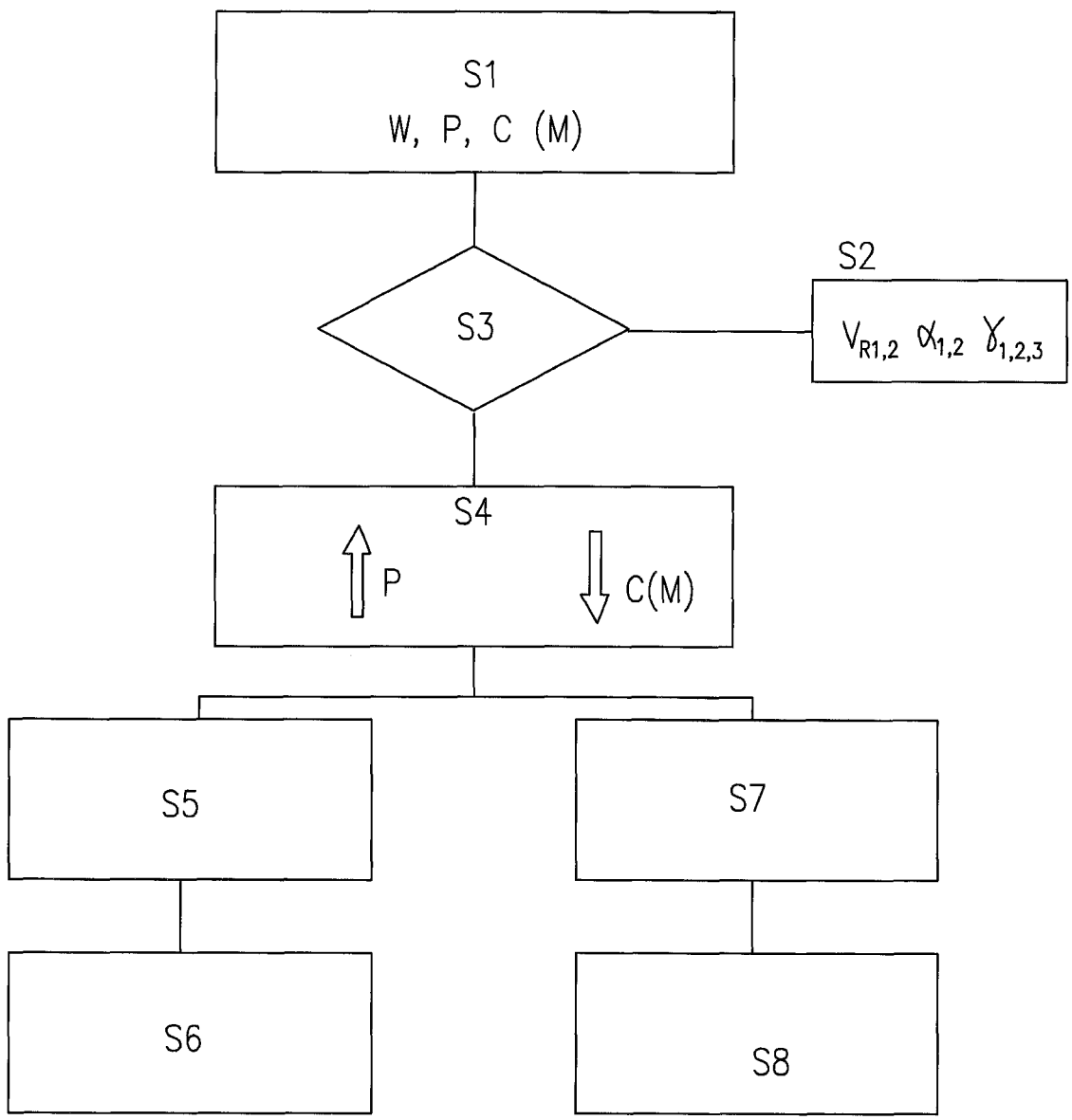
FIG. 7 is a block diagram of the washing and separating method according to the invention.

With the help of the block diagram in FIG. 7, the washing and separating method according to the invention is disclosed, which is implemented by the washing and separating apparatus 1 that has just been disclosed.

The plastics material P coming from the pre-washing and milling of post-consumption plastics waste, reduced into small pieces (dimensions from a few mm to a few cm) and containing contaminants C, is loaded together with an entering flow $F_{in}$ of washing fluid W, such as Water with possible additives, inside the washing container 2 (block S1). The block 52 shows the operation of setting the rotation speed's of the stirring device 3A and/or 3B, and the preliminary step of choosing appropriate angles (of tilt) $α_{1,2}$ of the blades 4.

The step then occurs of driving the stirrers 3 (block 53) that perform the turbulent stirring action to rub the plastics material P vigorously and detach and separate mechanically the contaminating material C from the plastics material P. The stirrers 3, in addition to stirring the plastics material P mechanically, induce the plastics material P to a floating condition whilst they allow the heavier contaminants C including metals M (block 54) to precipitate.

During the process, the step (block 55) of retaining, by rotating the control element 9, the plastics material P in the container 2 is provided for a suitable time, and the subsequent controlled release is provided, With resulting evacuation by overflow of the decontaminated plastics material P' together with an outward flow $F_{in}$ of fluid W (block S6).

The entering $F_{in}$ and exiting $F_{out}$ flows are adjustable according to the degree of "refresh" desired for the washing fluid W inside the washing container 2. The correct degree of "refresh" is determined by taking account of both the degree of purity and decontamination intended and the specific consumption saving requirements to be met.

The speed of the rotatable control element 9 can be adjusted according to the flowrates of entering/exiting fluid and of the degree of purity that it is desired to obtain for the processed plastics material P.

In case of operation with a great exchange of washing fluid W, thus with great inflow and outflow flowrates and a strong overflow effect, the rotatable control element 9 for retaining and controlled conveying acts to slow the flow of exiting plastics material with respect to the outward flow of fluid W, contrasting the dragging hydrodynmic action to the outlet port 5 and gradually releasing the plastics material P to the outlet port 5.

In the event of operation with reduced inflow and outflow of the fluid W, and thus a smaller overflow and dragging effect, the rotatable control element 9 performs a dragging effect that enables the processed plastics material P' to advance to the outlet port 5.

During washing, the heavy contaminating bodies drop by gravity and accumulate (block S7) on the bottom 6 of the container 2, from which they can be periodically evacuated by driving the relative valve device 11 (block S8).

From what has been disclosed and shown in the drawings, it is clear that the washing and separating method and apparatus according to the invention successfully achieve the set objects.

The method and the apparatus disclosed above enable high levels of purity to be obtained in the recovered plastics material in reduced time, owing to the immediate continuous removal of the contaminants from the washing container 2. Owing to the dual function of mechanical stirring and floating thrust performed by the stirrers 3, with a simple but effective solution, optimum separation of the contaminants from the plastics materials P is obtained, above all effective removal of the metals from the plastics material to be recovered. The results obtained are distinctly better than with traditional apparatus, in particular with respect to hydrocyclone systems that, not being able to perform a mechanical turbulence and stirring action in the fluid, are ineffective in the operation of detaching the dirt from the pieces of plastics material to which it sticks.

The object is thus achieved of providing a solution that is a functionally and constructionally simple that is nevertheless able to reduce the general process cost and ensure very high efficiency in separating the contaminants from the plastics materials to be recycled.

It should be noted that thanks to the presence of a single washing and separating chamber, delimited by the single washing container 2, a remarkable structural simplicity is achieved while at the same time excellent results are obtained from the point of view of the effectiveness and speed of the washing and separation process.

It is understood that what has been said and shown with reference to the attached drawings has been said merely by way of example of the general features of the method and of the washing and separating apparatus; thus other modifications or variations can be made to the method, to the entire apparatus, or parts thereof, whilst remaining within the scope of the claims. In particular, the geometric conformation, dimensions, positions and materials that make up one or more parts of the washing apparatus can be chosen and/or optimized on the basis of specific use needs and materials to be processed.

The invention claimed is:

1. Method for washing and separating pieces of plastics material from contaminating material that also includes metal elements, comprising the steps of:
   a. supplying a washing fluid having a first specific weight value and the pieces of plastics material with the contaminating material to a washing container via an inlet port;
   b. driving a stirring arrangement provided with blades in said washing container, a turbulent stirring action produced by said stirring arrangement removing a part of contaminating material from the plastics material through mechanical action,
   c. setting the tilt of said blades and adjusting the rotation speed of said stirring arrangement to generate a thrusting action upwards to maintain in a floating condition the plastics material having a second specific weight value that is greater than said first specific weight value of said fluid,
   d. limiting the force of said thrusting action to a value so as not to hinder the downward precipitation of said contaminating metal elements that have a further specific weight value greater than said second specific weight value, and
   e. arranging a rotatable control element having a horizontal axis; and including a plurality of baffles arranged in a discharge channel diametrically opposite said inlet port and bounded laterally by two side walls and below by a ramp wall, positioning said rotatable control element vertically with respect to said ramp wall so that the baffles engage the washing fluid below a free surface to intercept the pieces of plastics material maintained in the floating condition by said thrusting action, and driving the rotatable control element to retain said plastics material inside said washing container to obtain a desired degree of purity and decontamination for said plastics material,
   f. evacuating by controlled overflow via an outlet port bounded by said discharge channel of said washing container an outward flow of washing fluid and a quantity of decontaminated plastics material, wherein said washed and decontaminated plastics material is conveyed to said outlet port in a controlled manner through the action of said rotatable control element, and
   g. periodically evacuating the heavy contaminating material metal elements which accumulate on a bottom of said washing container during washing of the plastics material from the bottom of said washing container.

2. Method according to claim 1, wherein said stirring arrangement is configured with at least one stirring device having a rotor-shaft arranged vertically and on which a series of impeller units are mounted one above the other, each impeller unit comprising a group of blades, the blades of an impeller unit being tilted opposite the tilt of the blades of an impeller unit placed immediately above or immediately below.

3. Method according to claim 1, and further comprising the step of orienting the blades of a first impeller unit with a first angle of tilt between 5° and 30° with respect to a horizontal plane and orienting the blades of an impeller unit placed immediately above or immediately below said first impeller with a second angle of tilt between −5° and −30° with respect to the horizontal plane.

4. Method according to claim 1, wherein said stirring arrangement is driven at a rotation speed comprised between 200 and 400 rpm, so as to reach a value of said thrusting action such as to maintain in a floating condition bodies of plastics material with a specific weight that can be chosen from about 1 kg/dm$^3$ to about 2 kg/dm$^3$, enabling bodies with a specific weight value greater than the second specific weight value to precipitate to said bottom.

5. Method according to claim 1, wherein a turbulent stirring action is generated by two stirrers located on opposite sides with respect to a longitudinal axis of said washing container.

6. Method according to claim 2, wherein each rotor shaft of said at least one stirring device is provided with a number of impeller units ranging from 4 to 12, and in which each impeller unit comprises at least two blades.

7. Method according to claim 1, wherein said rotatable control element is of roller, drum or belt type and is driven at a rotation speed that is such as to retain said plastics material in said washing container to obtain the desired degree of purity and decontamination, and to convey in a controlled manner to said outlet port the washed and decontaminated plastics independently of the advancement of said outward flow of washing fluid.

8. Method according to claim 1, wherein the plastics material with contaminated material is supplied continuously to the washing container by an incoming flow of washing liquid, which includes water, having a flowrate corresponding to the flowrate of the flow of liquid exiting the outlet port.

9. Method according to claim 1, wherein the plastics material is separated from lighter contaminating materials that are conveyed and evacuated by the outward flow of washing fluid, and from heavier contaminating materials having a higher specific weight, including the metal elements, which decant on said bottom, and which are removed through a valve or pump evacuation device.

10. Apparatus for washing and separating pieces of plastics material from contaminating material that also includes metal elements, comprising:
  a washing container suitable for receiving and containing a washing fluid, having a first specific weight value, and the pieces of plastics material with the contaminating material;
  an inlet port for supplying to said washing container an incoming flow of said washing fluid and the plastics material to be decontaminated,
  a stirring arrangement provided with blades and arranged in said washing container, a turbulent stirring action produced by said stirring arrangement removing a part of contaminating material from the plastics material through mechanical action,
  said blades being oriented for impressing on said plastics an upward hydrodynamic thrust,
  an outlet port bounded by a discharge channel diametrically opposite said inlet port, by two lateral side walls and by a lower ramp wall evacuating by controlled overflow the decontaminated plastics material and an outward flow of said washing fluid with a portion of separate contaminants,
  a rotatable control element having a horizontal axis and including a plurality of baffles arranged in said discharge channel and positioned vertically with respect to said ramp wall so that the baffles engage the washing fluid below a free surface to intercept the pieces of plastics material maintained in the floating condition by said upward dynamic thrust, said rotatable control element being configured for retaining said plastics material in said washing container for a given time and subsequently advancing in a controlled manner said quantity of plastics to said outlet port,
  an evacuation device configured for periodically removing heavy contaminating material including metal elements that accumulates on a bottom of said washing container,
  a control unit programmed to adjust the rotation speed of said stirring arrangement to generate an upward thrusting action to maintain in a floating condition the plastics material having a second specific weight value that is greater than said first specific weight value of said fluid,
  said control unit being programmed to limit the force of said thrusting action to a value so as not to hinder precipitation downwards of said metal elements and of other contaminants having a further specific weight value greater than said second specific weight value.

11. Apparatus according to claim 10, wherein said stirring arrangement comprises at least one stirring device driven by a variable speed motor device, each stirring device having a rotor-shaft arranged vertically and on which a series of impeller units are mounted on one another, each impeller unit comprising a group of blades that are distributed equally angularly, in which the blades of an impeller unit are tilted opposite the tilt of the blades of an impeller unit placed immediately above or immediately below.

12. Apparatus according to claim 10, wherein the blades of a first group of impeller units are tilted by a first angle of incidence comprised between 5° and 30° with respect to a horizontal plane, and the blades of a second group of impeller units are tilted by a second angle of incidence comprised between −5° and −30° with respect to the horizontal plane, and wherein said stirring arrangement is configured for moving at a rotation speed comprised between 200 and 400 rpm.

13. Apparatus according to claim 10, wherein said stirring arrangement comprises two stirrers having respective rotor-shafts extending vertically and located on opposite sides with respect to a longitudinal axis of said washing container.

14. Apparatus according to claim 11, wherein each rotor shaft of said at least one stirring device comprises from 4 to 12 impeller units, and wherein each impeller unit comprises at least two blades.

15. Apparatus according to claim 10, wherein said rotatable control element is of the roller or drum or belt type and is driven by a further variable speed motor device and wherein said evacuation device for metals comprises a valve or pump device.

* * * * *